E. M. JONES.
AUTOMATIC STOPPING OR SIGNALING MECHANISM FOR TRAINS.
APPLICATION FILED MAR. 29, 1912.
1,129,203.
Patented Feb. 23, 1915.
2 SHEETS—SHEET 1.
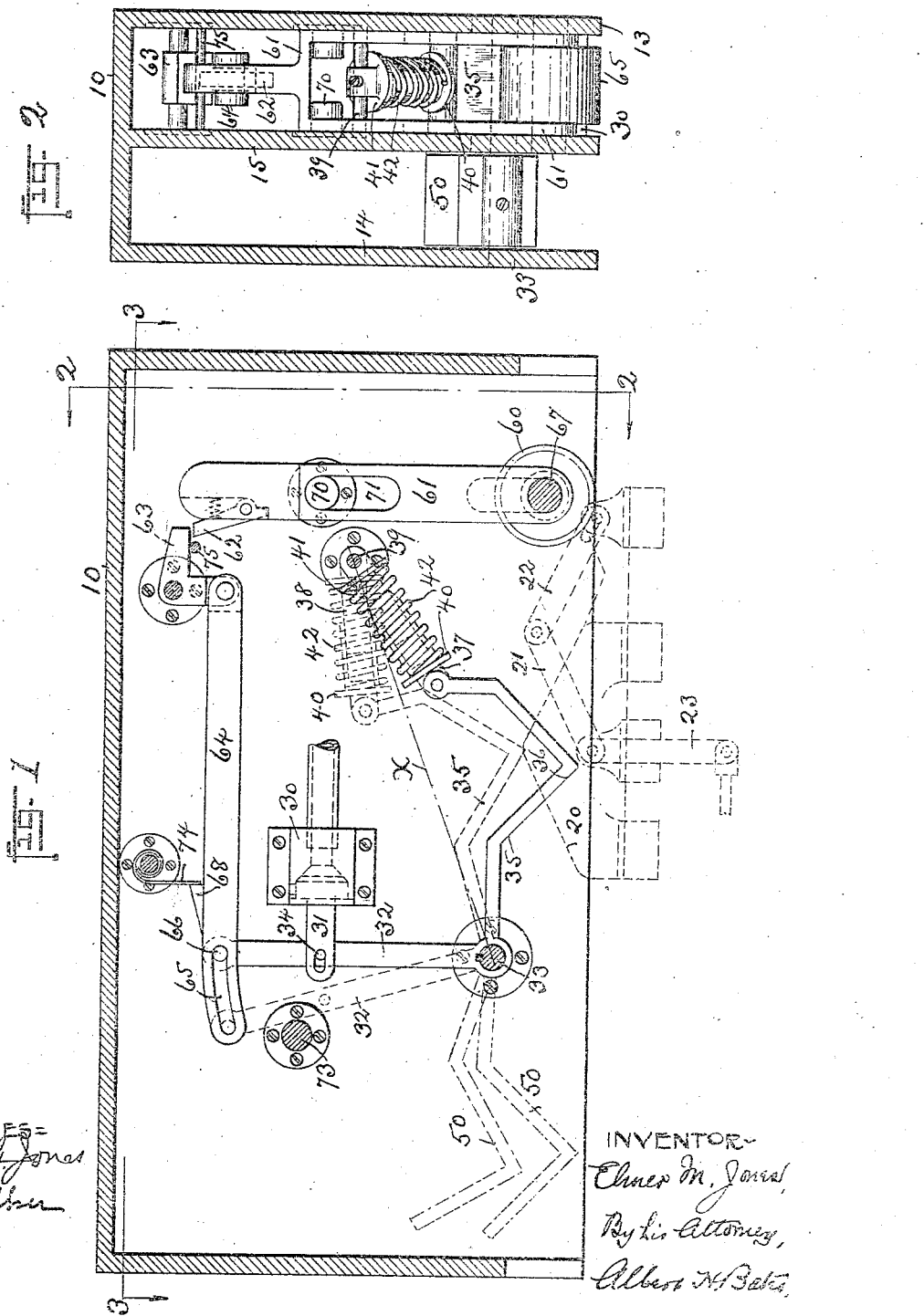

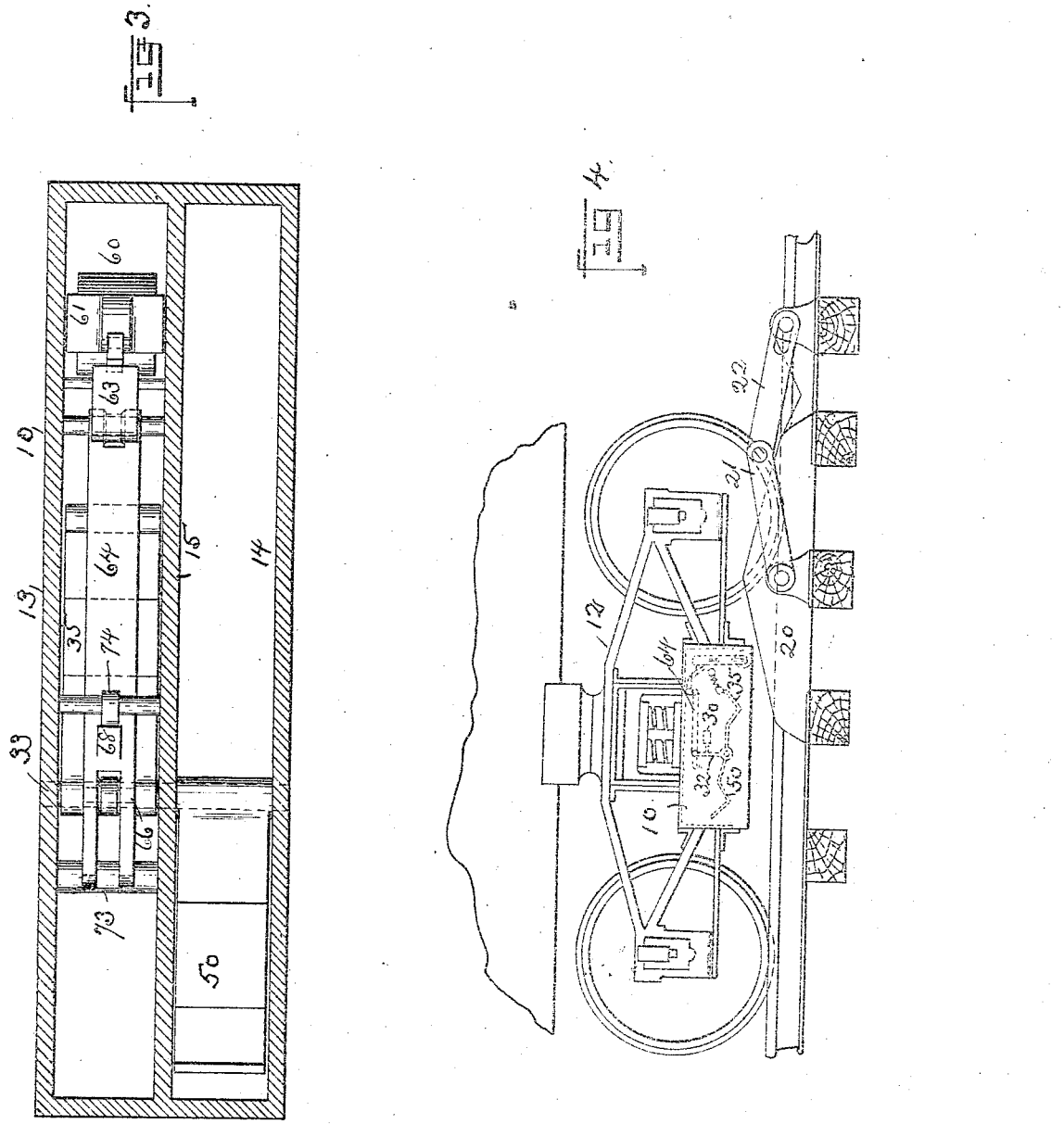

UNITED STATES PATENT OFFICE.

ELMER M. JONES, OF ATLANTA, GEORGIA, ASSIGNOR TO JONES SIGNAL SYSTEM COMPANY, OF ATLANTA, GEORGIA, A CORPORATION OF GEORGIA.

AUTOMATIC STOPPING OR SIGNALING MECHANISM FOR TRAINS.

1,129,803.     Specification of Letters Patent.     Patented Feb. 23, 1915.

Application filed March 29, 1912. Serial No. 687,283.

*To all whom it may concern:*

Be it known that I, ELMER M. JONES, a citizen of the United States, residing at Atlanta, in the county of Fulton and State of Georgia, have invented a certain new and useful Improvement in Automatic Stopping or Signaling Mechanism for Trains, of which the following is a full, clear, and exact description, reference being had to the accompanying drawings.

This invention relates to mechanism for automatically controlling moving vehicles as they travel past suitable track devices; the control may be either by direct application of the brake or the giving of a suitable signal on the vehicle.

The object of the invention is to provide vehicle mechanism which shall be very simple in construction, while being effective in service. The vehicle mechanism is designed particularly to co-act with that class of track device shown, described and claimed in my prior application, No. 628832, filed May 22nd, 1911, where there is a stationary ramp invariably operating to open the air valve on the vehicle, and an associated movable ramp adapted to immediately close the air valve when track conditions are at safety, but otherwise to leave it open.

The invention is hereinafter more fully explained in connection with a convenient illustration thereof, and the essential characteristics are set out in the claims.

In the drawings, Figure 1 is a vertical longitudinal section through a casing designed for attachment to a moving vehicle, and containing the mechanism of the present invention. Fig. 2 is a sectional end view of such mechanism, as indicated by the line 2—2 of Fig. 1. Fig. 3 is a sectional plan as indicated by the line 3—3 of Fig. 1. Fig. 4 is a side elevation of a vehicle truck equipped with this mechanism, this view showing also one of the track devices co-operating with the vehicle mechanism.

As shown in the drawings, 10 represents a suitable box or casing, adapted to be secured to a moving vehicle, as for example to the truck 12 shown in Fig. 4. This box is shown as of a substantial rectangular form, open at the bottom, and having an inner vertical wall 13 and outer wall 14, and an intermediate partition 15.

20 in Figs. 1 and 4 indicates a stationary ramp, positioned to co-act with mechanism on the vehicle between the walls 15 and 13, and 21 and 22 indicate bars designed to make a ramp, which may co-act with mechanism between the walls 15 and 14. It is to be understood that the bars 21 and 22 are pivotally joined together, and the bar 21 is connected with a suitable operating arm 23, which holds the bars in the peaked position shown to constitute a ramp, or may depress them to a substantial horizontal position, so as to be idle.

In Fig. 1, 30 indicates the casing of an air valve, and 31 the plunger thereof. 32 is an arm pivoted on a cross rod 33, and having a pin 34 acting on the plunger 31. Rigid with the arm 32 is an arm 35, bending downward to present an operating nose 36, and then upwardly where it is pivoted to a sleeve 37, which slides over a rod 38 pivoted on a stationary rod 39. The sleeve 37 and rod 38 are provided respectively with heads 40 and 41, and between these heads is a compression spring 42. The spring in normal position (as shown in full lines in Fig. 1) tends to hold the lever 35 depressed, and hold the plunger 31 against its seat in the valve casing.

The lever 35 described is normally in position to engage the stationary ramp 20, as the vehicle moves over the same, and such engagement raises the lever into the position shown in dotted lines in Fig. 1. This operation swings the arm 32 into the position shown in dotted lines, which positively and effectively withdraws the plunger 31 from its seat, opening the air valve. The spring 42 and the lever 35 are in the nature of a toggle, and as soon as the ramp has raised such toggle beyond the broken line designated X, the spring assists the ramp and operates to hold the lever in the open position when it clears the ramp.

To re-set the valve when the movable ramp is up, I provide a lever 50 in the space between the walls 14 and 15. This lever is rigid on the rock shaft 33, on which the arms 32 and 35 are keyed. Accordingly, whenever the lever 35 is raised, the arm 50 is depressed, from which it follows that as soon as the valve is opened by the raising of the lever 35, the lever 50 is in position to re-set the valve, and will do so if the movable ramp is up. The engagement of the lever 50 with this movable ramp swings the rock shaft and the arms 32 and 35, and restores the valve, returning the parts to normal position. The arm 50 in its two positions is shown in broken lines in Fig. 1, because it is in front of the plane of that section.

It will be noticed that the arm 35 is operated by the stationary ramp to open the valve, whether the vehicle is moving forwardly (that is, toward the right in Fig. 1) or rearwardly. As it is not desired, however, to give a danger indication on rearward movement, I provide means for immediately restoring the valve when the vehicle moves rearwardly. This means consists of the following mechanism, viz., a roller 60, carried between the forked sides of a slide 61, which carries a pawl 62, adapted to act on the bell crank 63, which is connected with a link 64, having a slot 65 surrounding a pin 66 on the arm 32. Now, assuming the vehicle to be moving rearwardly, the valve will be opened and the arms 35 and 32 in the positions shown in dotted lines in Fig. 1 as the lever 35 passes over the peak of the ramp. Now, when the roller 60 rides up on the ramp, the bar 61 is elevated, and this operates the bell crank 63, and pulls the link 64 to the right, whereby the end of the slot 65 engages the pin 66, and swings the arm 32 to the right, reseating the valve and restoring the lever 35.

The bar 61 is shown as having its lower portion in the nature of a fork sliding along the walls 13 and 15, and guided above by studs 70 entering slots 71 in the forks. Near its lower end, the bar is guided by the journal pin 67, extending into elongated recesses in the walls 15 and 13.

73 indicates a suitable stop for the lever 32.

74 is a coiled spring acting on a shoulder 68 on the link 64, and tending to force it toward the left.

75 is a stop for the bell crank 63 and link 64.

It is understood that on forward running, the roller 60 rides up on the ramp in advance of the engagement of the lever 35, but this operation is idle, as the pin 66 is at the right-hand end of the slot 65, and the slot simply moves across the pin. The spring behind the pawl 62 enables that pawl to clear the bell crank 63 after it has been sufficiently rocked, and prevents any sticking when the pawl passes downwardly across the bell crank.

It will be seen that the mechanism described is very simple in construction, while being effective, not only in normal running to release the valve and immediately restore it or not, according to track conditions, but also to invariably restore it on backward running.

I claim,

1. The combination with a valve of a lever adapted to open the same or hold it closed, a compression spring acting on the end of the lever and tending to hold it in either its open or closed position, said lever having an intermediate projecting portion adapted to engage an operating ramp.

2. The combination with stationary and movable ramps of a valve and an opening lever therefor adapted to engage the stationary ramp, and a closing lever therefor adapted to engage the movable ramp, said levers being rigidly connected to move as a unit.

3. The combination with stationary and movable ramps out of longitudinal alinement, a lever system on a vehicle having two portions adapted to alternately engage the respective ramps, and a valve controlled by said lever system.

4. The combination with stationary and movable ramps out of longitudinal alinement of a pair of intermediately pivoted levers on a vehicle having a part on one side of the pivot adapted to engage the stationary ramp and thereby be elevated, and a part on the other side of the pivot thereby depressed and adapted to engage the movable ramp if up, and a valve controlled by the rocking of said pair of levers.

5. The combination with a valve, of an operating device mounted on a pivot and having two arms extending on opposite sides of the pivot and out of longitudinal alinement and adapted to engage separate ramps, and a connection between said device and the valve.

6. The combination with a valve, of an operating device mounted on a pivot and having arms on opposite sides of the pivot and out of longitudinal alinement and adapted to engage separate ramps, a connection between said device and the valve, and a movable spring connected with said device adapted to hold it in either extreme position.

7. The combination with a valve, of a three-armed lever mounted on a pivot, two of its arms being out of longitudinal alinement and adapted to engage separate ramps, a compression spring connected with a free end of one arm adapted to hold it by toggle movement in either active or inactive position, the third arm of said lever being connected with the valve.

8. The combination with a valve of mechanism including a lever adapted to release it or hold it closed, a roller, and mechanism connected with the roller adapted to be moved thereby to restore the valve when released by the lever.

9. The combination with a valve of an operating lever connected therewith and adapted to release the valve, a roller, a slide connected therewith, and mechanism operated by the slide and having a loose play connection with the valve whereby it may be restored by the movement of the roller if open, while such movement is idle if the valve is already closed.

10. The combination of a valve, a lever connected therewith, a spring acting on the lever to hold it in position with the valve either open or closed, additional mechanism for closing the valve, a bodily movable roller, and mechanism connecting the same with said additional closing mechanism.

11. The combination of a valve, an intermediately pivoted lever system, having two operating arms and a third arm connecting with the valve, a spring acting on the lever system, a roller, a slide carrying the same, and connecting mechanism between the slide and the arm of the lever which connects with the valve.

In testimony whereof, I hereunto affix my signature in the presence of two witnesses.

ELMER M. JONES.

Witnesses:
ALBERT H. BATES,
DARWIN G. JONES.